United States Patent
Lohscheller et al.

(10) Patent No.: US 6,362,848 B1
(45) Date of Patent: Mar. 26, 2002

(54) BRIGHTNESS CONTROL ON VIDEO CAMERAS

(75) Inventors: Herbert Lohscheller, Aspach; Bernd Binder, Albstadt, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,777
(22) PCT Filed: Dec. 8, 1997
(86) PCT No.: PCT/DE97/02852
§ 371 Date: Oct. 20, 1999
§ 102(e) Date: Oct. 20, 1999
(87) PCT Pub. No.: WO98/32280
PCT Pub. Date: Jul. 23, 1998

(30) Foreign Application Priority Data

Jan. 17, 1997 (DE) .......................... 197 01 484

(51) Int. Cl.$^7$ .............................. H04N 7/18; H04N 5/235
(52) U.S. Cl. ........................................ 348/149; 348/221
(58) Field of Search ................................ 348/149, 221, 348/227; 382/104–105

(56) References Cited

U.S. PATENT DOCUMENTS 5,101,276 A * 3/1992 Ohta ........................... 348/221
5,809,161 A * 9/1998 Auty et al. .................. 382/104

* cited by examiner

Primary Examiner—Vu Le
(74) Attorney, Agent, or Firm—Kenyon & Kenyon

(57) ABSTRACT

A method for controlling the exposure of a stationary mounted video camera is proposed, which makes it possible to attain an optimal exposure even in difficult light circumstances. For this purpose, measuring zones in the image are evaluated and, using the evaluation, a correction factor is calculated which influences the exposure parameters of the camera.

15 Claims, 2 Drawing Sheets

BRIGHTNESS CONTROL ON VIDEO CAMERAS

FIELD OF THE INVENTION

The present invention relates to a method for controlling the exposure of stationary mounted video cameras, e.g., for traffic monitoring.

From the British Patent No. 2186 461, a method for controlling the exposure for a stationary video camera is described. At issue, in this context, are cameras which are used in automatic monitoring systems. These camera systems monitor an object on a 24-hour basis. This means that the exposure circumstances for the area being observed can change generally over the course of the day, even drastically. Such camera systems must have an automatic exposure control built in. In the British patent document, a sensor is proposed which detects the light conditions through the camera lens. Using the measured values, the illumination parameters of the camera are set and corrected. The sensor receives its exposure data from an area that is not the visual range of the video camera. This has the disadvantage that under very difficult light conditions predominating in the area to the observed, false exposures can occur. Thus it is possible, for example, that a wet and shiny street requires very different exposure conditions than can be recognized by the sensor from its measurement of an image segment, e.g., of an area of sky. Conventional automatic gain controls permit a continuous adjustment of the exposure parameters through a constant evaluation of the image content.

SUMMARY OF THE INVENTION

In contrast, a method according to the present invention has an advantage that the exposure parameters for the video camera are actually obtained from the image segment that the camera observes and actually on the light-sensitive plane. In addition, it is used for applications in which the strong differences of day and night are advantageously compensated for by a flash device. Thus it is possible to obtain a good exposure even in very difficult light conditions, if it is only individual images that are evaluated for adjusting the exposure parameters.

It is particularly advantageous that the method selects measuring zones from the image, and, using gray-scale histograms and cross correlations, determines a correction factor. It is particularly advantageous that the correction factor used for the exposure parameters is calculated as an average value of all the selected measuring zones. Furthermore, it is advantageous that the individual correction factor is monitored for its plausibility. In this way, it is avoided that, e.g., a vehicle moving through the image falsifies the exposure and thus the correction factor. Moreover, it is advantageous that, for the monitoring of an image overload, measuring zones are likewise selected from the image. For the presence of an overload to be confirmed, a plurality of criteria must be satisfied.

DETAILED DESCRIPTION

Figure 4:
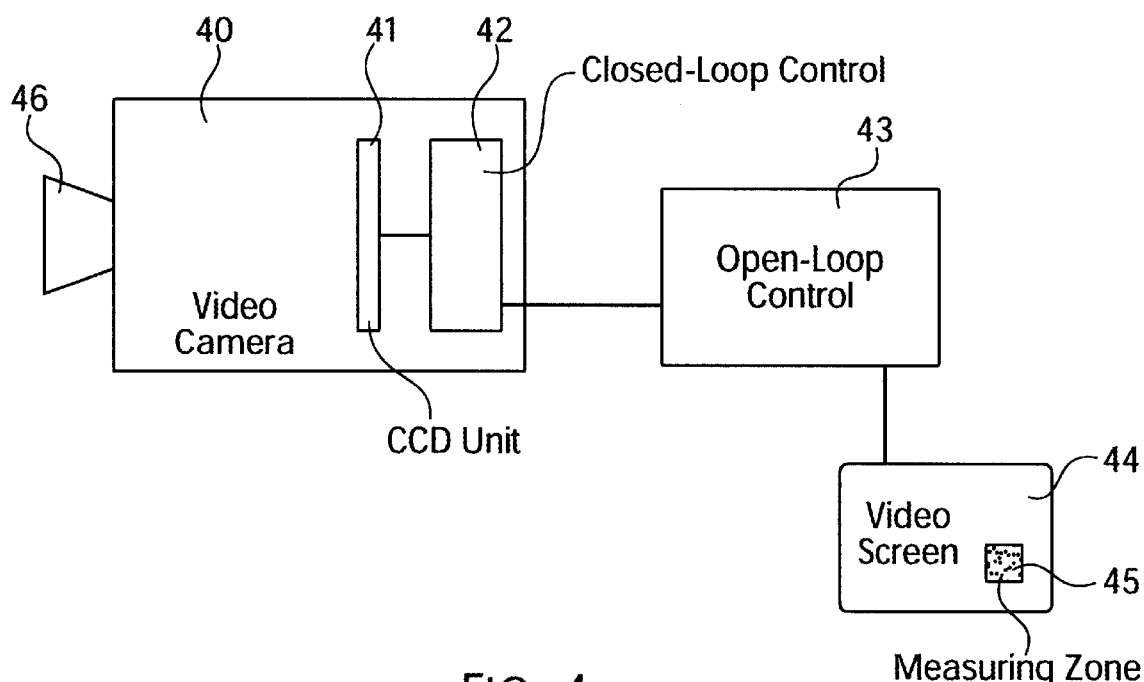
FIG. 4 shows an embodiment of a video camera according to the present invention

FIG. 4 depicts a video camera 40 having an objective 46 and a light-sensitive CCD unit 41. The CCD unit 41 is connected to a closed-loop control 42, which in turn is connected to an external open-loop control 43. External open-loop control 43 is connected to a video screen 44. On the video screen 44 individual images are shown, from which measuring zones 45 are selected.

The exposure control of a video camera according to the present invention is used, e.g., in a system for automatic traffic toll recording. A system of this type normally monitors the payment of tolls carried out in traversing a toll gate, and it generates still images of the vehicles. From the still images, e.g., the license plates are identified by automatic symbol recognition. The system must operate 24 hours a day, and therefore the exposure parameters of the camera must be adjusted to the specific light conditions. Exposure parameters are, for example, shutter settings, selection duration of the CCD cells, etc. For this purpose, the images recorded there partially with flash light are evaluated on an ongoing basis to determine the current light viewing situation.

Initially, from among the still images recorded electronically, which are present in open-loop control 43 as pixel images, a representative measuring zone is selected. A measuring zone 45 is defined as a cohesive sequence of image pixels. In this context, two different measuring zones are of importance:

measuring zones for determining the correction factor of the exposure, and measuring zones for the overload monitoring of the camera.

Figure 1:
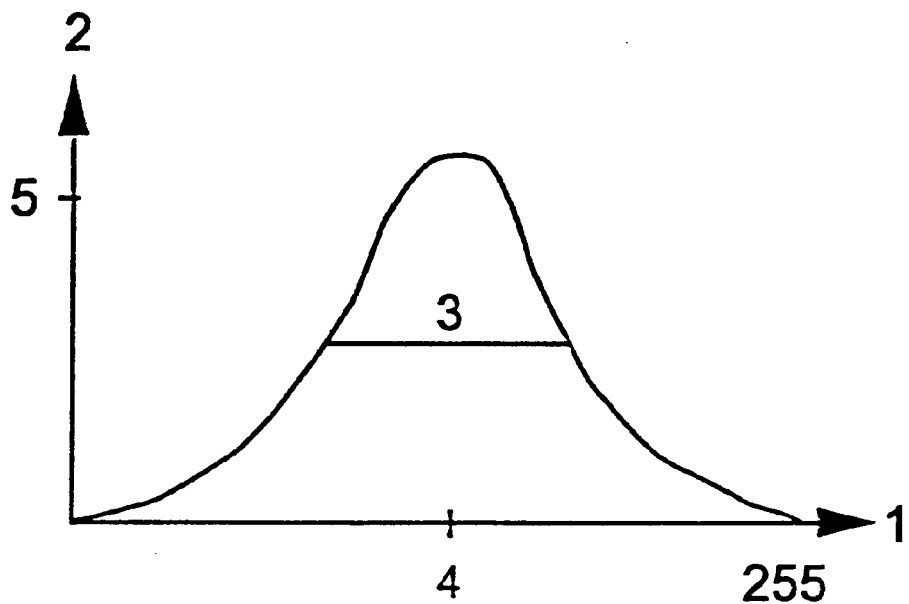
FIG. 1 depicts schematically a gray-scale histogram according to the present invention.

The number and the position of the measuring zones are established in the open-loop control 43 during the installation of the system, but at any time subsequently they can also be changed interactively. In this context, the type of measuring zone may be changed at will from a zone for determining the correction factor to a zone for overload monitoring. For the measuring zones, once they are established, e.g., for the subsequent determination of the correction factor, the gray-scale histogram is determined and stored. FIG. 1 indicates frequency 2 of a gray-scale value of individual pixels of measuring zone 45, as the y-axis plotted against gray-scale value 1 on the x-axis. For an 8-bit signal, the gray-scale value can have values between 0 and 255. Distribution 3 of the gray-scale histogram is the standard deviation of gray-scale values. The expected value is calculated using an average of the frequency distribution. From a gray-scale histogram of this type, further values such as position 4 and value 5 of the maximum of the distribution are calculated and stored.

For a first operational use, the system of the video camera is first calibrated. For this purpose, the exposure parameters of the camera, shutter speeds as well as intensification, are set so that in connection with the existing light situation, an ideal exposure of the image is obtained. In the system according to the present invention, apart from the visual monitoring of the exposure of the image, an immediate display of the gray-scale histogram of each measuring zone can take place. In this way, monitoring the results is possible already in the calibration. If the system is placed in operation, the exposure must constantly be monitored. If the exposure of a recently recorded image is to be monitored, then in determining the correction factor it is assumed that of each measuring zone for the correction factor both the values of the calibration described as well as the values of the image currently being recorded are available. Both values exist in the form of gray-scale histograms. To compare the exposure of the two images, the result of the cross correlation of the gray-scale histograms is taken into consideration. The cross correlation, from a mathematical point of view, is constituted by the sum of two comparable functions x and y having a shift vector τ.

Figure 3:
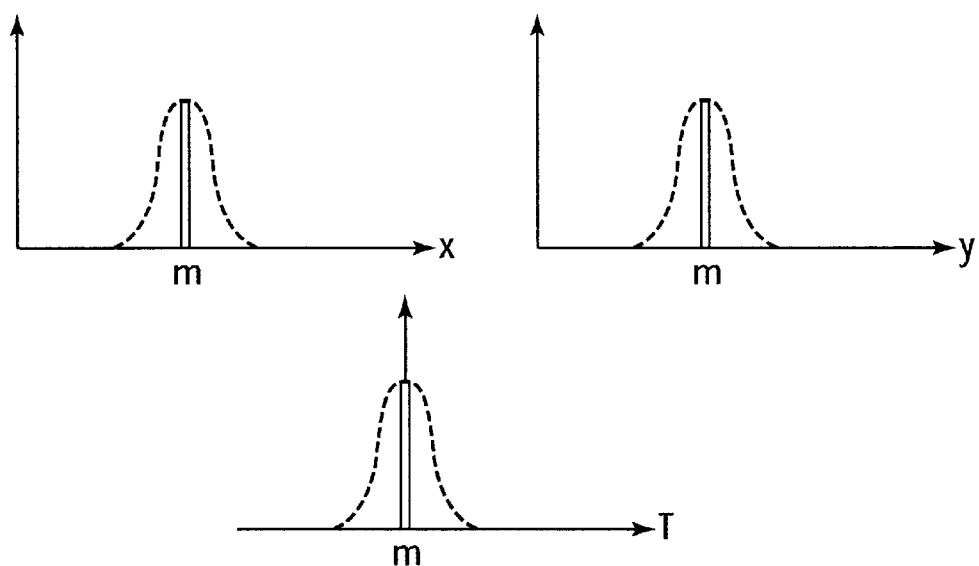
FIG. 3 schematically depicts a procedure in a cross correlation according to the present invention.

In FIG. 3, frequency 2 of certain gray-scale values is depicted as the y-axis plotted against gray-scale value 1 as the x-axis. Two functions x and y are depicted, both of which having a maximum at location m. If cross correlation functions are constituted using such functions, then the maximum is located exactly at τ=0. This is useful in the comparison of the exposure of the two images. The assumption in this context is that the characteristic curve of the function of the cross correlation does not change significantly if the image contents are the same but the exposures are different, but rather only the position of the maximum of the cross correlation shifts. It is also assumed with respect to the cross correlation coefficient, i.e., the maximum of the cross correlation, that it remains roughly 1 when the exposure changes. The position of the maximum, which is in the range greater or smaller than zero or at zero, is taken into consideration as an indicator for the quantitative change of the exposure situation. If the image contents were to change drastically between the two gray-scale histograms x and y, then one would have to assume that, e.g., a disturbing object was passing through the image at that moment and therefore the measurement for controlling an exposure could not be taken into consideration. The correction factor of each measuring zone is therefore the position of the maximum, weighted using the value of the maximum of the cross correlation. The overall correction factor, which modifies the exposure, is the negative average value of all individual correction factors weighted using the surfaces of the measuring zones. This correction factor indicates the necessary change of the camera exposure in gray-scale values. In order to exclude the possibility that correction factors are included in the weighting, in response to the correction factors the measurement being falsified by passing objects, then $$K = -\frac{1}{A_{ges}} \sum_{i=1}^{N} (A_i \; MaxCorr \; MaxPos)$$

where K: correction factor
$A_{ges}$: overall surface of the measuring zones
N: number of measuring zones from type 1
$A_i$: surface of measuring zone 1
MaxCorr: maximum of the cross correlation
MaxPos: position of the maximum of the cross correlation.
the correction factor must be subjected to a validation. One must be able to exclude the possibility that the image content within a measuring zone has changed and therefore the calculated value should not be used. The image content of a zone changes, for example, if a vehicle fills a zone completely or partially. This is undesirable for the measurement since the form of the gray-scale histogram is drastically altered as a result. Therefore, some criteria are set up which lead to discarding a correction factor of a measuring zone. These criteria are
a) A too-large difference between the expected value and the maximum of the cross correlation of the gray-scale histograms. The basis for this is the fact that the form of the cross correlation does not change significantly when the image content remains the same. Therefore, the maximum of the measurement and the expected value of the cross correlation must be very close or, in the ideal case, identical. The maximum permitted difference can be set by a threshold in the system described here.

b) A large difference between the standard deviation of the stored and of the current gray-scale histogram of the measuring zone. The criterion is introduced in the event that the image currently being recorded has a homogeneous characteristic curve of the gray-scale histogram over the entire area. Then the cross correlation will also have a homogeneous characteristic curve, for which reason it is possible that the expected value and the maximum are so close to each other that criterion a) is satisfied. The image contents of the measuring zones are, however, various in such a case and the measuring zone must be rejected. Therefore, the standard deviations, depicting the distribution of the gray-scale histogram, are compared. Here too, the maximum permitted difference can be set by a threshold.

Figure 2:
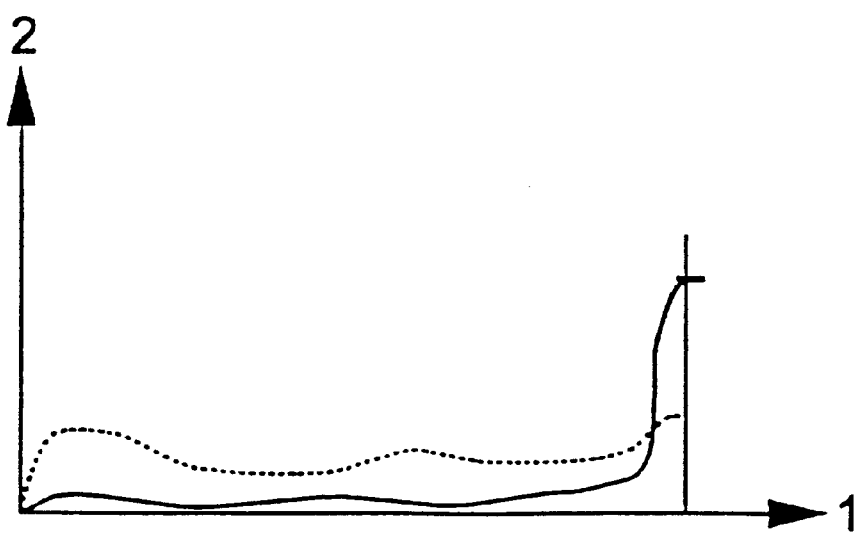
FIG. 2 depicts a gray-scale histogram under an overload according to the present invention.

In order to prevent an overload of the system, measuring zones are selected which function as overload monitoring. The gray-scale histogram is likewise determined from the measuring zones, and the measuring result is derived from the following criteria as an indication of an overload:

a) The maximum of the gray-scale histogram is at the highest possible gray-scale value. FIG. 2 indicates the frequency of selected gray-scale values 2, plotted against gray-scale values 1. As is depicted in FIG. 2 by the solid line, the maximum in a measurement of this type is at the maximum gray-scale value. The maximum gray-scale value is established by comparing the highest gray-scale value with the average value of a plurality of adjacent gray-scale values. A peak exists when the value at the highest gray-scale value is larger than the average value of the adjoining gray-scale values by a factor that can be adjusted.

b) In the gray-scale histogram, a peak exists at the highest gray-scale value, and the expected value of the gray-scale histogram is above a given threshold. The situation is depicted in FIG. 2 in the dotted line. In this case, there is no absolute maximum in the highest gray-scale value, but rather a generally elevated level over the entire distribution. If at least one of criteria a) or b) is satisfied, then the image area of the measuring zone is considered to be overloaded. For monitoring the overload, a plurality of measuring zones is evaluated. The evaluation always occurs on the basis of a plurality of images in sequence. The images as well as their gray-scale histograms are stored, irrespective of whether they were overloaded or not. If the current image is recognized as overloaded on the basis of one or a plurality of measuring zones, then the following conditions are checked: Did the calculation of the correction factor indicate that the image should be made brighter, and was a preselectable number of preceding images overloaded? If this condition is met, then a change in the exposure parameters of the camera is prevented. The entire sequence of the exposure control is divided into the following steps:

1. Determination of the size, position, and type of measuring zones in the image area. The system distinguishes between measuring zones for determining the correction factor and for overload monitoring.

2. Setting the optimal exposure.

3. Extraction and storage of the reference values of each measuring zone and of the current exposure parameters of the camera (calibration)

4. Continuous operation. In continuous operation, the control of the exposure is necessary. The sequence of the control can be summarized thus:

4.1 Selection of the last image recorded or, if the last image is too old, recording a new image and extracting the measuring data.

4.2 Comparison of the data of the current image with the stored reference data, determination of the correction value from the measuring zones for the correction value.

4.3 Checking the criteria for overload from the measuring zone for overload monitoring. In the event the criteria are satisfied, there is a return to Point 1).

4.4 Altering the camera parameters in the event that the amount of the correction value exceeds a preselectable value.

What is claimed is:

1. A method for controlling a plurality of exposure parameters of a stationary mounted video camera, comprising the steps of:

causing the stationary mounted camera to record a plurality of images;

processing the plurality of images according to a plurality of electronic pixels;

determining a correction factor by comparing gray-scale values of coherent sequences of the electronic pixels of a preceding image and the electronic pixels of a current image;

setting the plurality of exposure parameters by using the correction factor;

determining a size, a position, and a type of at least one measuring zone in an image area;

setting an optimal exposure;

extracting and storing reference values of the at least one measuring zone and reference values of current ones of the plurality of exposure parameters of the stationary mounted video camera; and performing a continuous operation, the continuous operation having adjustable time intervals.

2. The method according to claim 1, further comprising the steps of:

generating gray-scale histograms from gray-scale values of the at least one measuring zone;

evaluating the gray-scale histograms using a cross correlation; and calculating the correction factor from the cross correlation.

3. The method according to claim 2, wherein the step of calculating the correction factor includes the step of:

calculating the correction factor as an average value over all of the at least one measuring zone.

4. The method according to claim 1, wherein the step of performing the continuous operation in order to provide the control includes the steps of:

determining a current image by performing one of the steps of:

selecting a last one of the recorded images, and recording a new image and extracting measuring data therefrom, comparing data of the current image with the stored reference values;

determining a correction value, monitoring for an overload condition, and changing camera parameters if the correction value exceeds an adjustable value.

5. The method according to claim 1, further comprising:

checking a histogram of at least one of the measuring zones against criteria associated with a presence of an overload condition.

6. The method according to claim 1, wherein the step of determining the size, the position, and the type of measuring zone in the image area includes:

selecting the type of at least one of the at least one measuring zone as a measuring zone for determining the correction factor.

7. The method according to claim 1, wherein the step of determining the size, the position, and the type of measuring zone in the image area includes:

selecting the type of at least one of the at least one measuring zone as a measuring zone or overload monitoring.

8. The method according to claim 1, further comprising:

checking the correction factor for plausibility.

9. The method according to claim 1, wherein the step of determining the size includes setting the size of the at least one measuring zone, the size being variable.

10. A method for controlling a plurality of exposure parameters of a stationary mounted video camera, comprising the steps of:

causing the stationary mounted camera to record a plurality of images;

processing the plurality of images according to a plurality of electronic pixels;

determining a correction factor by comparing gray-scale values of coherent sequences of the electronic pixels of a preceding image and the electronic pixels of a current image;

setting the plurality of exposure parameters by using the correction factor;

determining a size, a position, and a type of a plurality of measuring zones in an image area;

setting an optimal exposure;

extracting and storing reference values of each one of the plurality of measuring zones and reference values of current ones of the plurality of exposure parameters of the stationary mounted video camera;

performing a continuous operation in order to provide a control at adjustable time intervals;

checking the correction factor with respect to an exploitability thereof; and providing criteria for a plausibility of the correction factor.

11. A method for controlling a plurality of exposure parameters of a stationary mounted video camera, comprising the steps of:

causing the stationary mounted camera to record a plurality of images;

processing the plurality of images according to a plurality of electronic pixels;

determining a correction factor by comparing gray-scale values of coherent sequences of the electronic pixels of a preceding image and the electronic pixels of a current image;

setting the plurality of exposure parameters by using the correction factor;

determining a size, a position, and a type of a plurality of measuring zones in an image area;

setting an optimal exposure;

extracting and storing reference values of each one of the measuring zones and reference values of current ones of the plurality of exposure parameters of the stationary mounted video camera;

performing a continuous operation in order to provide a control at adjustable time intervals;

generating gray-scale histograms from gray-scale values of the measuring zones;

evaluating the gray-scale histograms using a cross-correlation;

calculating the correction factor from the cross correlation;

evaluating the measuring zones for overload monitoring; and checking the gray-scale histograms of the measuring zones against criteria associated with a presence of an overload.

12. A method for controlling a plurality of exposure parameters of a stationary mounted video camera, comprising:

causing the stationary mounted camera to record a plurality of images;

establishing at least one measuring zone in an image area, the establishing step including determining a position, and a type of the at least one measuring zone;

determining a correction factor by comparing gray-scale values of electronic pixels corresponding to the selected at least one measuring zone of a preceding image and the current image; and setting the plurality of exposure parameters by using the correction factor.

13. The method according to claim 12, further comprising:

changing at least one of the position and type of at least one of the at least one measuring zone.

14. The method according to claim 12, wherein the determining the position and the type of the at least one measuring zone includes:

determining a first one of the at least one measuring zone to be first type, the first type being a zone for determining the correction factor, and determining a second one of the at least one measuring zone to be a second type, the second type being a zone for overload monitoring of the camera.

15. The method according to claim 12, wherein the first one of the at least one measuring zone is in a position that is different than a position of the second one of the at least one measuring zone.

* * * * *